UNITED STATES PATENT OFFICE.

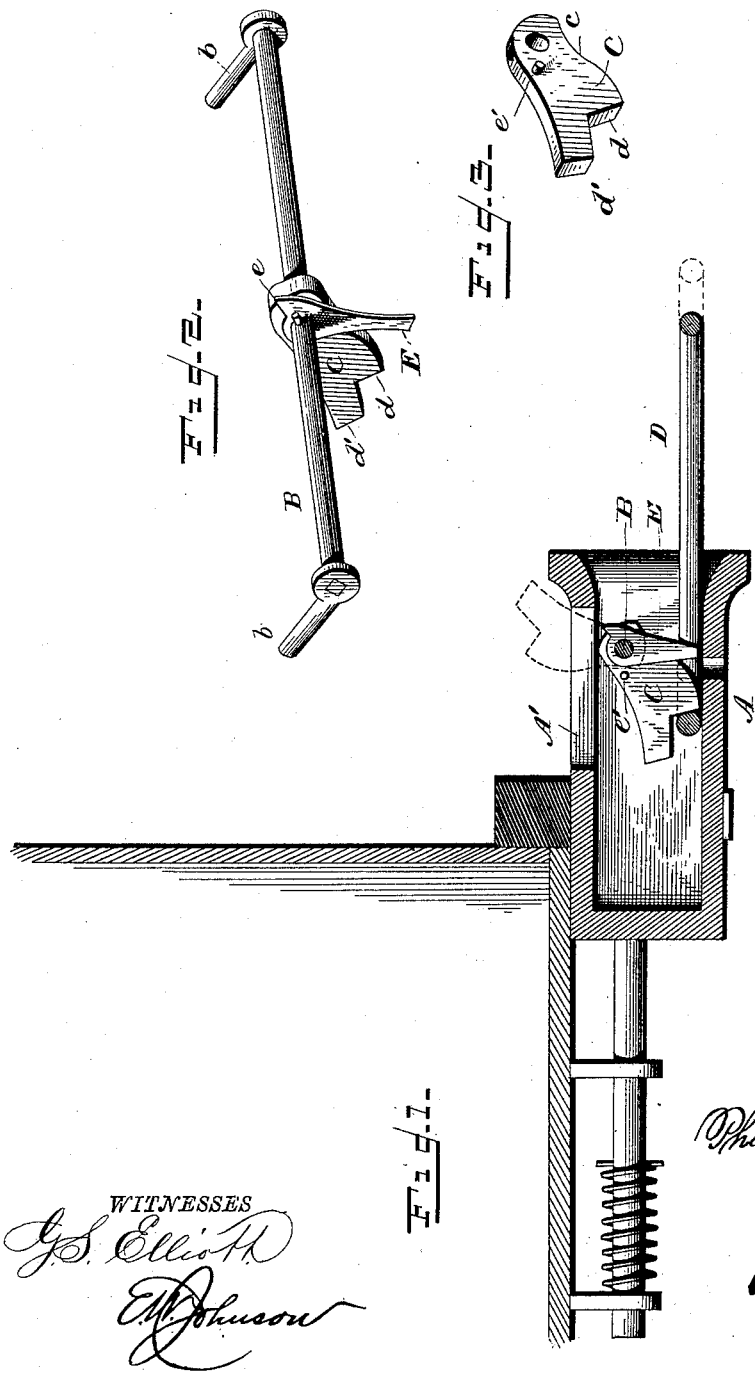

PHILO JAY NORTON, OF BRISTOL, NEW YORK.

CAR-COUPLING.

SPECIFICATION forming part of Letters Patent No. 342,262, dated May 18, 1886.

Application filed March 25, 1886. Serial No. 196,561. (No model.)

*To all whom it may concern:*

Be it known that I, PHILO JAY NORTON, a citizen of the United States of America, residing at Bristol, in the county of Ontario and State of New York, have invented certain new and useful Improvements in Car-Couplers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in car-couplings, the object of the same being to provide a means whereby the cars can be coupled automatically, and when uncoupled the coupling-dog will be brought to a position for coupling before the link is inserted in the draw-head; and to this end my invention consists in the construction and combination of the parts, as will be hereinafter fully set forth, and specifically pointed out in the claim.

In the accompanying drawings, which illustrate my invention, Figure 1 is a sectional view of a car-coupler constructed in accordance with my improvement, and Figs. 2 and 3 are detail perspective views.

A refers to the draw-head, which is attached to the car in the usual manner, said draw-head being provided at its upper side with a longitudinal slot, A', through which the dog may pass when raised, as shown in dotted lines in Fig. 1.

B refers to a transverse bar, which is journaled in the sides of the draw-head, said rod or bar being provided at its ends which extend on a line or beyond the sides of the car with levers *b b*, for turning this bar, so as to uncouple the cars without the necessity of going between the same. To the central portion of said bar, and immediately under the slot in the draw-head, a dog or coupling device, C, is rigidly secured thereon. The under side of this dog is curved, as shown at *c*, so that the link D may slide under the same, and near its rear end it is cut away, so as to provide an almost vertical portion, *d*, against which the inner side of the link will bear. A rearwardly-projecting portion, *d'*, extends under the portion *d* so as to lie above the link and prevent the same being displaced.

It will be here noted that when the link draws against the portion *d* of the dog it will have a tendency to force it downward upon the lower inner side of the draw-head, and the draft will come upon this portion of the draw-head and the bar D, to which the dog is secured. Loosely pivoted to one side of the dog is a depending arm, E, which has a projecting portion, *e*, which is adapted to engage with the side projecting pin, *e'*, attached to the dog C.

The operation of my improved car-coupler is as follows: When the parts are arranged as shown in Fig. 1 in full lines, the end of the link while being inserted in the draw-head will first abut against the outer edge of the depending arm E and will swing the same rearwardly, so that its rear edge will abut against the side projecting pin, *e'*, so that when the link is further inserted the dog will be raised and the link may be slid rearwardly until it is under the rearwardly-projecting portion *d'* of the dog, and the dog will fall and the link will be held securely in position.

When it is desired to uncouple the cars, the levers are elevated until the dog rests against the forward end of the slot in the draw-head, as shown in Fig. 1, and when the link is drawn out of the draw-head it will contact with the rear edge of the depending arm and swing the same outwardly, which movement will cause the projecting portion *e* thereof to engage with the pin *e'* of the dog and trip the same, so that it will fall to the position shown in full lines, thus placing it in a position to automatically couple when the next link is inserted therein.

I claim—

In a car-coupling device, the combination of the draw-head A, provided at its upper portion with a slot, A', the pivoted bar B, having rigidly attached thereto a dog, C, constructed as described, and provided with a side projecting pin, *e'*, an arm, E, loosely journaled on the bar B adjacent to the dog, and provided with a projecting portion which is adapted to engage with the pin *e'* of the dog, substantially as shown, and for the purpose set forth.

In testimony whereof I affix my signature in presence of two witnesses.

PHILO JAY NORTON.

Witnesses:
F. K. McMANN,
GEO. L. BLACKMAN.